United States Patent [19]
DeWitt et al.

[11] Patent Number: 5,882,149
[45] Date of Patent: Mar. 16, 1999

[54] APPARATUS AND METHOD FOR MEASURING THE MASS FLOW OF PNEUMATICALLY CONVEYED PARTICLES

[75] Inventors: Charles M. DeWitt, Newton, N.Y.; Ross Good, South Lyon, Mich.; Patrick Schoening, Sterling Heights, Mich.; Timothy Wayne March, Wixom, Mich.

[73] Assignees: Ford Global Technologies, Inc., Dearborn; Low Emissions Paint Consortium, Wixom, both of Mich.

[21] Appl. No.: 732,560
[22] Filed: Oct. 15, 1996
[51] Int. Cl.[6] ................................. B65G 53/48
[52] U.S. Cl. ............................. 406/56; 406/136
[58] Field of Search ............................. 406/56, 136, 137, 406/138

[56] References Cited

U.S. PATENT DOCUMENTS

| | | | |
|---|---|---|---|
| 2,793,914 | 5/1957 | Gardeniers et al. | 406/56 |
| 4,091,385 | 5/1978 | Petlevich et al. | 343/8 |
| 4,183,702 | 1/1980 | Bonnel | 406/56 |
| 4,480,947 | 11/1984 | Nagasaka | 406/14 |
| 4,574,623 | 3/1986 | Neumann | 73/56 |
| 5,336,731 | 8/1994 | Ondrus et al. | 523/370 |
| 5,338,609 | 8/1994 | Ondrus et al. | 428/402 |
| 5,351,520 | 10/1994 | Buquet | 73/7 |
| 5,356,334 | 10/1994 | Gray | 454/51 |

FOREIGN PATENT DOCUMENTS

| | | | |
|---|---|---|---|
| 596565 | 5/1934 | Germany | 406/56 |
| 831692 | 5/1981 | U.S.S.R. | 406/56 |

*Primary Examiner*—Gary C. Hoge
*Attorney, Agent, or Firm*—Damian Porcari; Roger L. May

[57] ABSTRACT

An apparatus (10) is disclosed for measuring the mass flow of pneumatically conveyed particles along a transport tube 14. The apparatus includes a fluidized bed of the particles 16 and an application device or collection box 18. The improvement comprises means for unfluidizing the fluidized particles in communication with the fluidized bed. Additionally, one or more augers 22 are provided for delivering particles at a predetermined air pressure in predetermined amounts in communication with the means for unfluidizing and one or more pumps 24 are provided downstream from the one or more augers 22. A sensor 26 is downstream from the one or more pumps. The particles then are conveyed from the sensor to the collection box. A method is also provided to measure the mass flow of pneumatically conveyed particles along a transport tube with an apparatus which includes a fluidized bed of the particles and a collection box. The improvement comprises unfluidizing the fluidized particles in the fluidized bed, delivering the unfluidized particles via a hopper through an auger, and pneumatically conveying the unfluidized particles through a pump situated downstream from the auger. Finally, the mass flow is sensed by a sensor downstream from the pump.

9 Claims, 3 Drawing Sheets

APPARATUS AND METHOD FOR MEASURING THE MASS FLOW OF PNEUMATICALLY CONVEYED PARTICLES

TECHNICAL FIELD

This invention relates to an apparatus and method for measuring mass flow of pneumatically conveyed powders and more specifically to powder painting.

BACKGROUND ART

Precise measurement of the flow rate of powder conveyed by a fluid is relevant to various technologies besides powder painting—food processing, toner manufacturing, and coal processing industries to name a few.

It is known to provide powder flow rate measuring devices between a fluidized powder storage tank and a powder conveyor device including a compressed air pump which imparts to the air-powder mixture sufficient energy to enable it to be conveyed in a transport to a device at which it is applied.

The prior art includes two main types of flow meters: (1) the so-called true mass flow meter, which responds directly to mass flow rate, and (2) the inferential mass flow meter, which commonly measures volume flow rate and fluid density separately. PERRY'S HANDBOOK OF CHEMICAL ENGINEERING. When measuring mass flow of pneumatically conveyed powder paint particles, one potential "true mass flow meter" relies on the Coriolis effect. However, Coriolis meters are inappropriate for powder painting production applications due to impact fusion. When particles are pneumatically conveyed through curved tubing, inertia of the particles causes some of them to collide with the walls of the tube. The energy of the impact results in fusion of some of the particles to the tube walls. Experience with the problem indicates that ½-inch tubes can become entirely blocked in less than three months.

Inferential mass flow meters are limited by problems associated with particle velocity and the volume ratio of powder to air (or concentration if powder density is constant).

Capacitance has also been used as a method for particle concentration measurement. The dielectric constant of a dilute particle-air mixture is is a function of the concentration of that mixture. If tubing is configured to be a capacitor, changes in particle-air concentration will change the dielectric constant, which in turn will change the capacitance of the capacitor. U.S. Pat. No. 3,636,763 is illustrative of such approaches. Other approaches in using capacitance technology to measure particle velocity are disclosed in U.S. Pat. Nos. 3,595,078 and 3,635,082.

It is now conventional to use the Doppler effect to measure velocity and concentration of fluids using laser and ultrasonic energy sources for the Doppler devices. Laser-based systems, however, are intrusive—they must be mounted so that the laser beam "sees" the flow. This limits their effectiveness in powder applications because powder buildup on the sensor window would blind a laser-based system and render it useless. Also, ultrasonic approaches tend to suffer from problems stemming from environmental noise. Additionally, the sensors tend to be very dependent upon solids content. Ultrasonic sensors are disclosed in U.S. Pat. No. 4,882,934.

SUMMARY OF THE INVENTION

Conventionally, an apparatus for measuring the mass flow of pneumatically conveyed particles along the transport tube includes a fluidized bed of the particles and a collection box such as a gun or application device. The invention of the present invention is an improvement that includes a hopper which feeds one or more augers for delivering particles in predetermined amounts into one or more pumps located from the augers. A sensor is located downstream from the pumps. Preferably, the sensor is a microwave Doppler sensor for measuring flow rate and for quantifying the mass of particles coming out of suspension during transport.

The inventive method for measuring the mass flow of pneumatically conveyed particle includes the following steps:

unfluidizing the fluidized particles in the fluidized bed;

delivering the unfluidized particles via a hopper through an auger;

pneumatically conveying the unfluidized particles through a pump situated downstream from the auger; and sensing the mass flow by a sensor downstream from the pump.

Additional objects and advantages of the present invention will be apparent from the following description considered in connection with the accompanying drawings.

BEST MODES(S) FOR CARRYING OUT THE INVENTION

Figure 1:
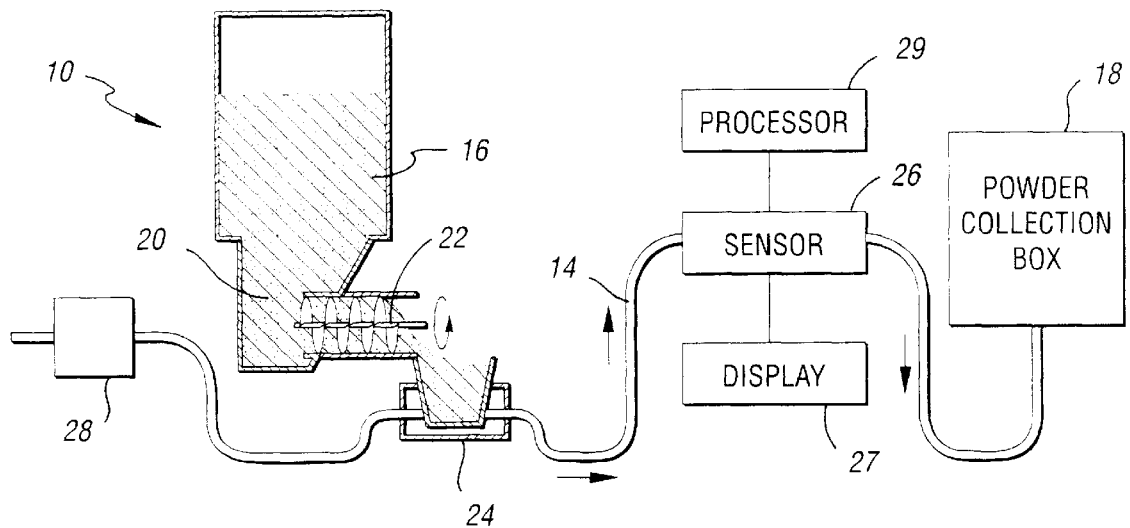
FIG. 1 is a schematic illustration of the apparatus of the present invention by which the inventive method is practiced.

Turning first to FIG. 1 of the drawing, there is depicted an apparatus 10 for measuring the mass flow of pneumatically conveyed particles along a transport tube 14. Conventionally, the apparatus includes a fluidized bed 16 of the particles and a collection box or application device 18. Examples include a gun and a rotary application. In FIG. 1, the gas flow meter 28 is an anemometer calibrated for cubic feet per minute (CFM).

Located in communication with the fluidized bed of particles 16 is a means for unfluidizing (such as a hopper) the fluidized particles. The hopper 20 feeds one or more augers 22 for delivering particles in predetermined amounts to one or more pumps 24 which deliver the particles at a predetermined air pressure.

Located downstream from the one or more pumps 24 is a sensor 26 from which the particles are conveyed to the application box 18.

Preferably, the sensor 26 comprises a microwave Doppler sensor for measuring flow rate and for quantifying the mass of particles coming out of suspension during transport. Ideally, the one or more augers 22 include means for controlling their rotation rate such as an electric motor.

In operation, the sensor 26 includes means 27 for displaying a flow pattern of the particles in response to a condition sensed by the sensor, thereby detecting flow phenomena such as steady-state, surging, and leakage. Also depicted is a processor 29 which includes control logic for determining the flow pattern, which can be implemented by software, hardware, or both. The processor could be a programmed microprocessor, a discrete computer, and the like.

The method of the present invention utilizes the above-described apparatus. The method steps are:
  unfluidizing the fluidized particles in the fluidized bed;
  delivering the unfluidized particles via a hopper through an auger;
  pneumatically conveying the unfluidized particles through a pump situated downstream from the auger; and
  sensing the mass flow by a sensor downstream from the pump.

In practice, the sensing step may include quantifying the mass of particles that come out of suspension during transport.

Preferably, the method also includes the step of generating an output signal based on the condition sensed by the sensor, thereby enabling deleterious changes in the mass flow to be detected so that preventive maintenance can be performed.

Thus, the inventors have combined an auger delivery system with a microwave Doppler sensor in a novel manner which enables mass flow delivery to within 2 percent accuracy by controlling auger RPM. A picture of the particle flow pattern is provided by the sensor which allows detection of phenomena such as surging and leakage. Additionally, the system allows for quantification of the mass of particles that come out of suspension during transport.

When air velocity through the transport tube is ostensibly constant, the microwave Doppler sensor serves as an on-line calibration for the auger system in a manner to be described. When air velocities are relatively constant, the sensor can be used for a mass flow indication.

Thus, the apparatus of the disclosed invention can detect deleterious changes in the flow delivery system such as internal diameter tube constriction due to powder build-up in the tube over time. The auger will continue to deliver a set amount of particles and at a given air pressure, as the system degrades, the microwave Doppler signal will trend downward. Preventive maintenance can then be performed on the particle delivery system based on system sensor outputs.

Combined with a microprocessor, the system can be used to totalize the mass of powder to run through the delivery system. This is useful for inventory tracking and in the case of powder painting, efficiency calculations.

Preferably, the disclosed auger system is available from the Illinois Tool Works (ITW). A microwave Doppler sensor such as that available under the product name Granuflow (GMR130) from is suitable. A microwave cavity perturbation sensor system is manufactured by Rockwell International.

The apparatus by which the inventive method is practiced includes a total length of flow meter to collection box of about 25–30 feet. In practice, the auger system is calibrated by placing a beaker underneath its outlet and measuring the difference in mass. Tests show that the auger system accurately delivers between 30 and 250 grams per minute.

Air CFM is controlled by controlling the air pressure delivered to the system. Conventionally (not depicted), both an air valve and the auger are wired to a timer that is generally set for a 30 second delivery of powder. Various sensors are connected and tested at a variety of auger speeds at CFM levels. The sensors are wired to a data collection device 29 and the data is subsequently downloaded for analysis. Humidity is not controlled.

Figure 2:
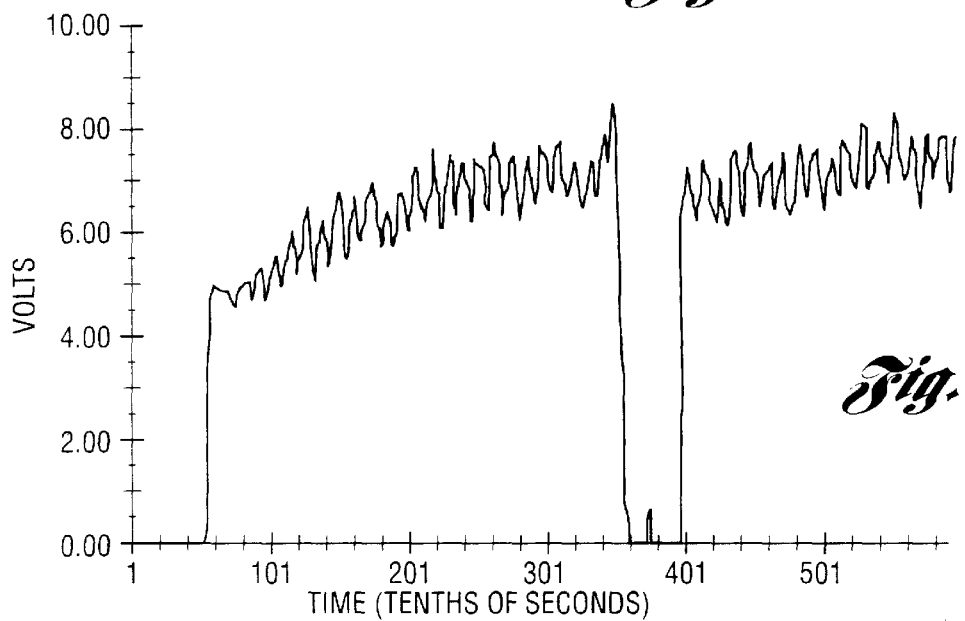
FIG. 2 illustrates a unfiltered sensor output used for frequency analysis according to the present invention.

FIG. 2 shows that the powder delivered in the testing system has a periodic nature. For certain combinations of tubing configurations and transport air pressure, significant amounts of powder settle in the tube.

Frequency analysis was performed on data gathered at 10 readings per second at mass flow rates of 34 grams per minute and 93 grams per minute. The signal from the 34 g/min run showed a periodicity corresponding to a 20 RPM auger speed. The signal from the 93 g/min has a frequency spike corresponding to 60 RPM.

Occasionally it was noted that after the powder was turned off (and air was still blowing through the tube), the sensor signal would spike. The spike indicated that powder had come out of suspension. The powder had accumulated in the delivery system during the 30 seconds that the auger was delivering powder to the jet pump. A follow up trial was run to verify the hypothesis and data clearly showed that the Tealgate (capacitance type) signal was not spurious; powder was accumulating in the system at high powder flow rates.

FIG. 2 depicts the results of a trial run to determine the sensor's ability to predict mass flow rate at a fixed velocity. While the sensor may be useful in determining powder/no powder situations, its usefulness as a concentration sensor appears limited. A trial was run to determine the sensor's ability to predict mass flow rate at a fixed velocity. Air CFM was fixed at 2.4 CFM and a randomized series of auger settings were used ranging from 33 to 251 grams per minute. Data was collected once per second for 60 seconds. After 30 seconds of powder delivery, the auger and air were simultaneously shut off. Subsequently, the line was blown out and the sensor's response to accumulated powder was measured. A typical trial is depicted.

Figure 3:
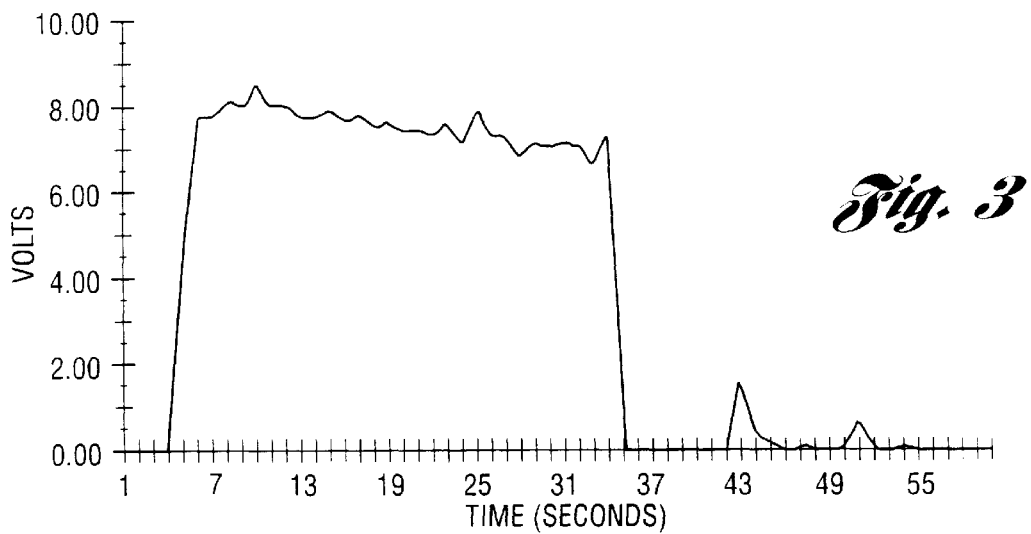
FIG. 3 illustrates test results which determine a sensor's ability to predict mass flow rate at a fixed velocity according to the present invention.
Figure 4:
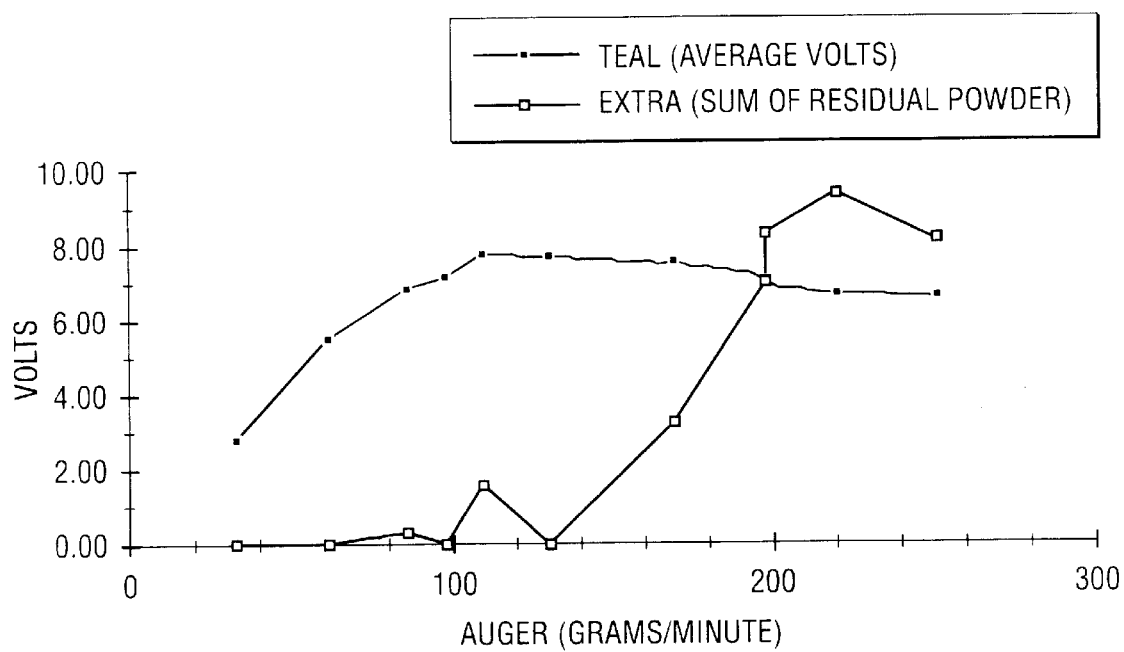
FIG. 4 depicts unfavorable test results of a capacitance-type sensor, which indicate that the capacitance-type sensor signal saturates at typical powder flow rates and that at higher auger flow rates, extra powder accumulates in the line.

FIG. 3 depicts the results from using typical powder flow rates. At higher auger flow rates, extra powder accumulates in the line.

Figure 5:
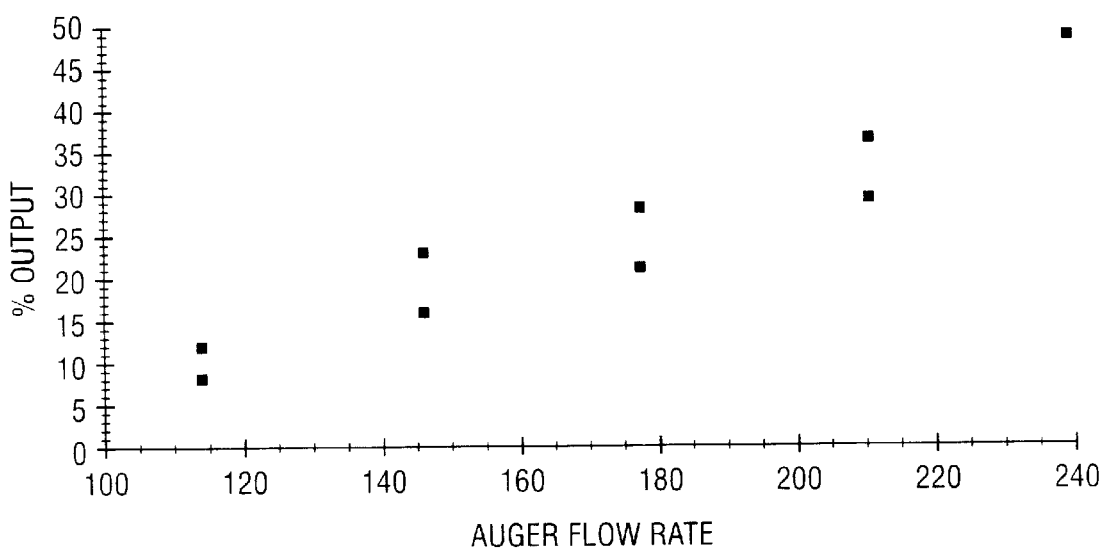
FIG. 5 illustrates that the entire range of powder flow rate was captured using only half of the sensor's output range.
Figure 6:
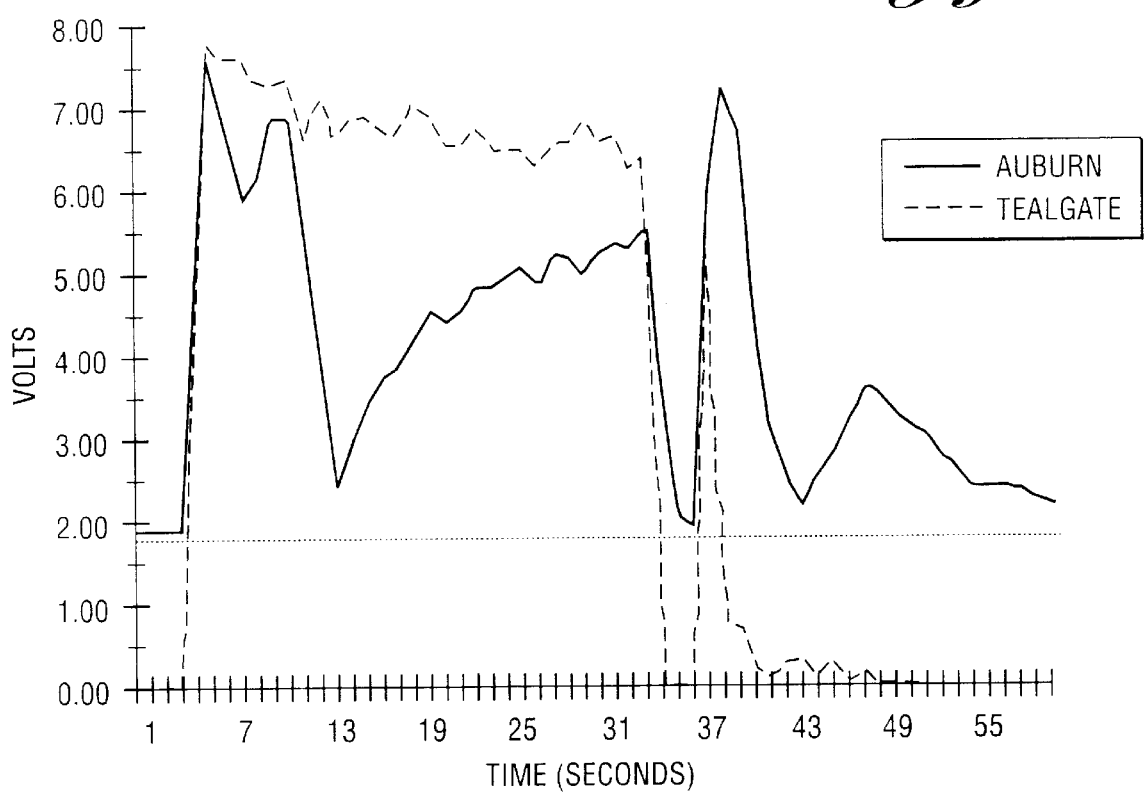
FIG. 6 illustrates the triboelectric and capacitance apparatus' erratic response to a constant auger flow rate of 197 grams per minute in which a powder build-up condition is sensed thereby.

Turning now to FIG. 5, there is depicted the results of using an Endress & Hauser microwave Doppler device that measures particle concentration in a pneumatic stream. The GMR130 is a microwave-based device that measures the intensity of reflected Doppler-shifted energy. A gun-diode emits a low power continuous signal that is reflected from moving material in the process. The reflected signal has a Doppler frequency proportional to the speed of the moving material. The GMR130 then measures only the intensity of the Doppler signal, thus allowing it to differentiate between moving material and build-up.

The entire range of the powder flow rate was captured using half of the sensor's output range. It is likely that this same sensor could be used even at flow rates typical in Bell applications (300 to 400 grams/minute). In other words, this sensor signal does not saturate and there is plenty of span/zero adjustment left. While the signal was somewhat noisy, an internal damping factor adjustment or external filtering can easily remedy the situation. The sensor is non-intrusive and not affected by build-up in the hose.

Further tests revealed the results of using two sensors to detect an auger flow rate of about 197 grams per minute.

Undesirably, at about 13 seconds, one triboelectric mass-flow sensor output spiked sharply downward and then built slowly upwards. It is unlikely that the mass flow rate actually spiked sharply downward at that point. It is however plausible that the flow pattern changed, so that fewer particles collide with a sensing ring. Each sensor detected the powder build-up at about 35–37 seconds.

Figure 7:
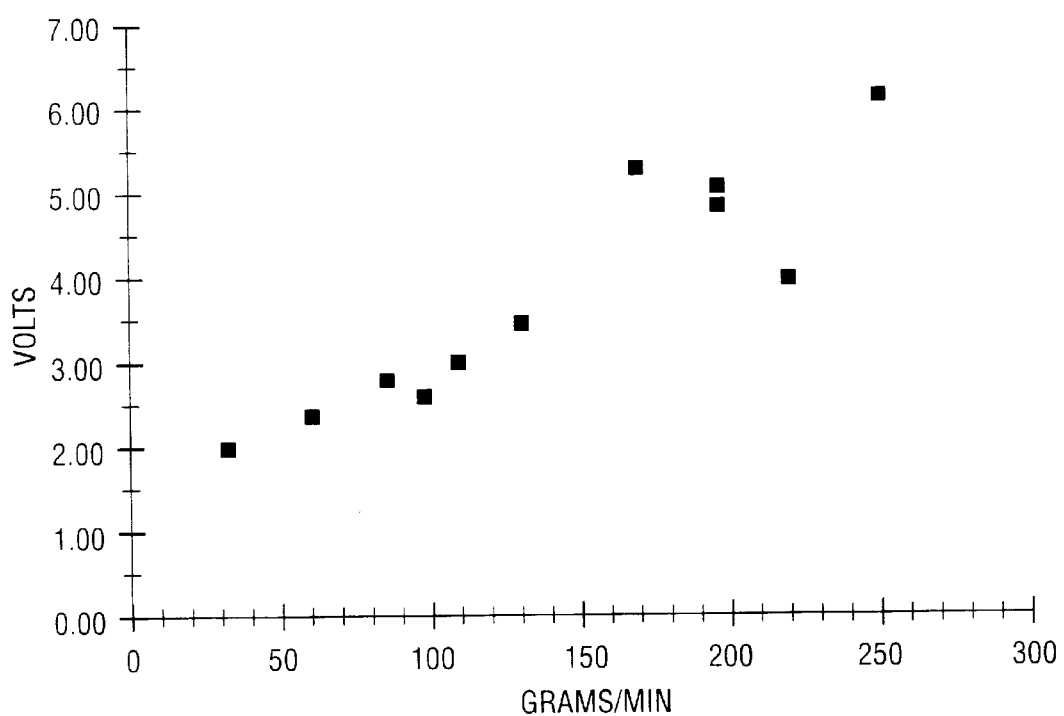
FIG. 7 illustrates the triboelectric apparatus' response to a randomly run series of auger speeds.

FIG. 7 depicts the response of one triboelectric sensor (Auburn) to a randomly-run series of auger speeds.

Conventional auger systems stem from Archimedean screws. Such systems provide methods for particulate metering. Auger systems assume that the bulk density of given powder is essentially constant. If that is the case, then auger RPMs, over a certain range, are linear with mass flow of powder delivered to the pneumatic system. Tests have shown that the ITW unit is capable of delivering 30–250 grams per minute with a 2 percent accuracy.

The system disclosed includes a fluidized bed or particle which feeds a small unfluidized delivery hopper 20.

Preferably, banks of augers feed banks of powder applicators.

While the best mode for carrying out the invention has been described in detail, those familiar with the art to which this invention relates will recognize various alternative designs and embodiments for practicing the invention as defined by the following claims.

What is claimed is:

1. In an apparatus for measuring the mass flow of pneumatically conveyed particles from a fluidized bed of the particles along a transport tube to an application device, an improvement comprising:

a hopper for unfluidizing the fluidized particles in communication with the fluidized bed;

one or more augers for delivering unfluidized particles in predetermined amounts in communication with the hopper;

one or more pumps downstream from the one or more augers for conveying the particles at a predetermined air pressure; and a sensor for detecting flow characteristics in communication with the tube downstream from the one or more pumps, wherein the sensor comprises:

a microwave Doppler sensor for measuring flow rate and for quantifying the mass of particles coming out of suspension during transport that may cause constriction in the tube due to particle build-up, thereby detecting flow phenomena such as steady state, surging and leakage so that preventive maintenance can be performed.

2. The apparatus of claim 1, further comprising:

means for controlling auger rotation rate.

3. The apparatus of claim 1, further comprising:

a display device for displaying a flow pattern of the particles in response to a condition sensed by the sensor.

4. The apparatus of claim 1 wherein the one or more augers comprises one auger.

5. The apparatus of claim 1 wherein the one or more pumps comprises one pump.

6. In a method for measuring the mass flow of pneumatically conveyed particles from a fluidized bed of the particles along a transport tube to a collection box, an improvement comprising:

unfluidizing the fluidized particles in the fluidized bed;

delivering unfluidized particles through a hopper that supplies an auger;

pneumatically conveying the unfluidized particles by a pump situated downstream from the auger through the transport tube; and sensing the mass flow by a sensor downstream from the pump.

7. The method of claim 6, wherein the sensing step includes:

quantifying the mass of particles that come out of suspension during transport.

8. The method of claim 6, further comprising:

generating an output signal based on the condition sensed by the sensor, thereby enabling deleterious changes in the mass flow to be detected so that preventive maintenance can be performed.

9. In a method, for measuring the mass flow of pneumatically conveyed particles from a fluidized bed of the particles along a transport tube to a collection box, an improvement comprising:

unfluidizing the fluidized particles in the fluidized bed;

delivering unfluidized particles through a hopper that supplies an auger;

pneumatically conveying through the transport tube the unfluidized particles by a pump situated downstream from the auger; and sensing the mass flow by a sensor downstream from the pump, wherein the sensing step includes quantifying the mass of particles that come out of suspension during transport.

\* \* \* \* \*